US006718283B2

(12) United States Patent
Lanham et al.

(10) Patent No.: US 6,718,283 B2
(45) Date of Patent: Apr. 6, 2004

(54) METHOD AND APPARATUS FOR PREDICTING HEATER FAILURE

(75) Inventors: Christopher C. Lanham, St. Charles, MO (US); Rolando O. Juliano, Hannibal, MO (US)

(73) Assignee: Watlow Electric Mfg. Co., St. Louis, MO (US)

( * ) Notice: Subject to any disclaimer, the term of this patent is extended or adjusted under 35 U.S.C. 154(b) by 0 days.

(21) Appl. No.: 09/683,447

(22) Filed: Dec. 31, 2001

(65) Prior Publication Data

US 2002/0165691 A1 Nov. 7, 2002

Related U.S. Application Data

(62) Division of application No. 09/316,803, filed on May 21, 1999, now Pat. No. 6,336,083.

(51) Int. Cl.[7] .................................................. H02H 3/08

(52) U.S. Cl. ........................................ 702/183; 702/185

(58) Field of Search ................................ 702/185, 183, 702/58, 64, 65; 315/115; 324/500, 512, 525; 361/7, 15; 714/25; 374/137; 703/4, 5

(56) References Cited

U.S. PATENT DOCUMENTS 5,019,760 A * 5/1991 Chu et al. .................... 318/490
6,336,083 B1 * 1/2002 Lanham et al. ............. 702/185

* cited by examiner

*Primary Examiner*—Marc S. Hoff
*Assistant Examiner*—Paul L Kim
(74) *Attorney, Agent, or Firm*—Blumenfeld, Kaplan & Sandweiss, P.C.

(57) ABSTRACT

A method is shown of predicting failure of resistive element heaters using a compiled database of measured ratiometric factors affecting heater life. The method can either be carried out actively, by continuously measuring known factors affecting heater life and decrementing a count of the remaining heater life, or the method may be carried out passively by estimating the operating profile and the averages within each segment of the profile, of the factors affecting heater life.

8 Claims, 4 Drawing Sheets

| MEASUREMENT TIME | INTER-VAL t | MEASURED SHEATH TEMP F | MgOK BTU-In/Hr-F-Sq.Ft | SHEATH K BTU-In/Hr-F-Sq.Ft | CALCU-LATED COIL TEMP F | COIL LIFE FACTOR F(T) | t / F(T) | LIFE USED DURING t | TOTAL TIME USED | TOTAL LIFE USED | TOTAL HOURS REMAINING | % LIFE REMAINING θ PF |
|---|---|---|---|---|---|---|---|---|---|---|---|---|
| 00:07.0 | 1 | 1200.83 | 8.90664 | 153.04118 | 1858.93 | 24.061 | 0.0416 | 5.51709E-08 | 1 | 5.517E-08 | 5034.86 | 99.999994% |
| 00:08.0 | 1 | 1203.03 | 8.90078 | 153.19540 | 1861.56 | 23.499 | 0.0426 | 5.64906E-08 | 2 | 1.117E-07 | 4975.36 | 99.999989% |
| 00:09.0 | 1 | 1204.41 | 8.89711 | 153.29214 | 1863.20 | 23.146 | 0.0432 | 5.7351E-08 | 3 | 1.690E-07 | 4930.60 | 99.999983% |
| 00:10.0 | 1 | 1208.59 | 8.88603 | 153.58516 | 1868.18 | 22.079 | 0.0453 | 6.01241E-08 | 4 | 2.291E-07 | 4849.12 | 99.999977% |
| 00:11.0 | 1 | 1215.05 | 8.86901 | 154.03801 | 1875.88 | 20.429 | 0.0489 | 6.49775E-08 | 5 | 2.941E-07 | 4722.28 | 99.999971% |
| 00:12.0 | 1 | 1219.94 | 8.85621 | 154.38079 | 1881.70 | 19.182 | 0.0521 | 6.92043E-08 | 6 | 3.833E-07 | 4587.34 | 99.999964% |
| 00:13.0 | 1 | 1225.28 | 8.84231 | 154.75513 | 1888.06 | 17.820 | 0.0561 | 7.44937E-08 | 7 | 4.378E-07 | 4441.28 | 99.999956% |
| 00:14.0 | 1 | 1227.63 | 8.83622 | 154.91986 | 1890.85 | 17.221 | 1.1581 | 7.70857E-08 | 8 | 5.149E-07 | 4315.85 | 99.999949% |
| 00:15.0 | 1 | 1225.36 | 8.84210 | 154.76074 | 1888.15 | 17.799 | 0.0562 | 7.45791E-08 | 9 | 5.895E-07 | 4241.05 | 99.999941% |
| 00:16.0 | 1 | 1224.64 | 8.84397 | 154.71026 | 1887.29 | 17.983 | 0.0556 | 7.38176E-08 | 10 | 6.633E-07 | 4187.85 | 99.999934% |
| 00:17.0 | 1 | 1222.15 | 8.85045 | 154.53572 | 1884.33 | 18.618 | 0.0537 | 7.12997E-08 | 11 | 7.346E-07 | 4159.51 | 99.999927% |
| 00:18.0 | 1 | 1219.58 | 8.85715 | 154.35556 | 1881.27 | 19.274 | 0.0519 | 6.88745E-08 | 12 | 8.035E-07 | 4148.68 | 99.999920% |
| 00:19.0 | 1 | 1215.62 | 8.86752 | 154.07796 | 1876.56 | 20.284 | 0.0493 | 6.54435E-08 | 13 | 8.689E-07 | 4155.90 | 99.999913% |
| 00:20.0 | 1 | 1210.36 | 8.88135 | 153.70924 | 1870.29 | 21.627 | 0.0462 | 6.13805E-08 | 14 | 9.303E-07 | 4180.28 | 99.999907% |
| 00:21.0 | 1 | 1205.96 | 8.89299 | 153.40080 | 1865.05 | 22.750 | 0.0440 | 5.8349E-08 | 15 | 9.886E-07 | 4214.53 | 99.999901% |
| 00:22.0 | 1 | 1202.13 | 8.90317 | 153.13231 | 1860.48 | 23.729 | 0.0421 | 5.59432E-08 | 16 | 1.045E-06 | 4254.74 | 99.999896% |
| 00:23.0 | 1 | 1200.83 | 8.90664 | 153.04118 | 1858.93 | 24.061 | 0.0416 | 5.51709E-08 | 17 | 1.100E-06 | 4293.88 | 99.999890% |
| 00:24.0 | 1 | 1203.03 | 8.90078 | 153.19540 | 1861.56 | 23.499 | 0.0426 | 5.64906E-08 | 18 | 1.156E-06 | 4324.33 | 99.999884% |
| 00:25.0 | 1 | 1204.41 | 8.89711 | 153.29214 | 1863.20 | 23.146 | 0.0432 | 5.7351E-08 | 19 | 1.214E-06 | 4348.87 | 99.999879% |
| 00:26.0 | 1 | 1208.59 | 8.88603 | 153.58516 | 1868.18 | 22.079 | 0.0453 | 6.01241E-08 | 20 | 1.274E-06 | 4361.67 | 99.999873% |
| 00:27.0 | 1 | 1215.05 | 8.86901 | 154.03801 | 1875.88 | 20.429 | 0.0489 | 6.49775E-08 | 21 | 1.339E-06 | 4357.46 | 99.999866% |
| 00:28.0 | 1 | 1219.94 | 8.85621 | 154.38079 | 1881.70 | 19.182 | 0.0521 | 6.92043E-08 | 22 | 1.408E-06 | 4340.57 | 99.999859% |
| 00:29.0 | 1 | 1225.28 | 8.84231 | 154.75513 | 1888.06 | 17.820 | 0.0561 | 7.44937E-08 | 23 | 1.482E-06 | 4309.83 | 99.999852% |
| 00:30.0 | 1 | 1227.63 | 8.83622 | 154.91986 | 1890.85 | 17.221 | 1.1581 | 7.70857E-08 | 24 | 1.559E-06 | 4274.92 | 99.999844% |
| 00:31.0 | 1 | 1225.36 | 8.84210 | 154.76074 | 1888.15 | 17.799 | 0.0562 | 7.45791E-08 | 25 | 1.634E-06 | 4249.80 | 99.999837% |
| 00:32.0 | 1 | 1224.64 | 8.84397 | 154.71026 | 1887.29 | 17.983 | 0.0556 | 7.38176E-08 | 26 | 1.708E-06 | 4228.76 | 99.999829% |
| 00:33.0 | 1 | 1222.15 | 8.85045 | 154.53572 | 1884.33 | 18.618 | 0.0537 | 7.12997E-08 | 27 | 1.779E-06 | 4215.42 | 99.999822% |
| 00:34.0 | 1 | 1219.58 | 8.85715 | 154.35556 | 1881.27 | 19.274 | 0.0519 | 6.88745E-08 | 28 | 1.848E-06 | 4208.62 | 99.999815% |
| 00:35.0 | 1 | 1215.62 | 8.86752 | 154.07796 | 1876.56 | 20.284 | 0.0493 | 6.54435E-08 | 29 | 1.913E-06 | 4209.85 | 99.999809% |
| 00:36.0 | 1 | 1210.36 | 8.88135 | 153.70924 | 1870.29 | 21.627 | 0.0462 | 6.13805E-08 | 30 | 1.975E-06 | 4219.66 | 99.999803% |
| 00:37.0 | 1 | 1205.96 | 8.89299 | 153.40080 | 1865.05 | 22.750 | 0.0440 | 5.8349E-08 | 31 | 2.033E-06 | 4235.19 | 99.999797% |
| 00:38.0 | 1 | 1202.13 | 8.90317 | 153.13231 | 1860.48 | 23.729 | 0.0421 | 5.59432E-08 | 32 | 2.089E-06 | 4254.74 | 99.999791% |

FIG. 4

METHOD AND APPARATUS FOR PREDICTING HEATER FAILURE

This application is a divisional of application Ser. No. 09/316,803 filed May 21, 1999, now U.S. Pat. No. 6,336, 083.

1. Field of the Invention

The present invention relates generally to electrical resistance heaters ("resistive element heaters") and more particularly to a method and apparatus for predicting the failure of said heaters.

2. Background of Invention

Past efforts to develop a failure prediction system for resistive element heaters have concentrated largely on the search for a parametric method, meaning a method for detecting pending failure based on the change in a measurable parameter such as heater element electrical resistance, voltage, or current.

These methods have been unsuccessful, primarily because the rates of change of simple parameters such as resistance, although sometimes a good indicator of heater degradation, are not reliable as statistically consistent signatures of pending failure. Although sometimes a dramatic shift may be detected prior to failure, often little or no shift occurs. Oxidation of the heating element may impact the resistance, and oxidation rates can vary based on temperature and power level. Therefore, since it is typical for the temperature and power to vary dramatically under normal operational conditions, oxidation rates may also vary, making a failure prediction based solely on a measured change in resistance statistically unreliable.

Significant research and laboratory testing of resistive element heaters have been performed searching for parameters that are useful for heater failure prediction, and as a result a large database of information is available concerning the effect of various design, construction, and operating variables on resistive element heater service life. Most of the data that is available can be considered constant value, independent variables, meaning the data gathered are based on specific heater designs, operating within specific repetitive operating thermal and power profiles. Data of this nature can be useful for methods of predicting reliability for a specific heater design when service parameters, such as average sheath temperature and cycle rate are assumed.

However, the problem in using methods such as the one described above to actively predict failure during actual heater operation is that a heater is not typically operated in a specific repetitive profile, and even if a repetitive cycle is seen during actual operation, the cycle is usually complex or may vary significantly due to changes in input power, process demand and heat transfer efficiency.

As indicated above, research in this area has shown that measured heater element independent parameters are not generally practical in predicting heater failure. Often little or no shift of single given parameter occurs until the actual time of failure because of the inherent variations in the specific heater construction and their relation to the specific stresses present in the operating environment. As a result, relying on a single independent parameter results in a prediction method with low statistical accuracy. It is possible that a system that monitors many independent parameters simultaneously might improve prediction accuracy; however, such a system would require complex measurement equipment and would be cost prohibitive.

Gammaflux is a manufacturer of hot runner systems for the plastic injection molding industry. They sell a product that purports to predict resistive element heater failure, called MOLD MONITOR®, which is an on-line software package to be utilized with their Series 9500 temperature control systems. The product periodically calculates the resistance of the heater element by monitoring the applied voltage and current draw of the resistive element for a change, which would indicate a heater resistance shift. However, as noted earlier, this method is not effective for detecting many heater failure modes. Unless the prediction method consistently predicts the majority of failure types, its usefulness is severely limited.

U.S. Pat. No. 5,736,930 issued Apr. 7, 1998 to Cappels addresses failure prediction of an apparatus similar to that of a heater element. This patent addresses failure prediction of a radiation source and more specifically a lamp or bulb for an overhead projector or the like. The similarity between the type of apparatus shown in Cappels for which failure is predicted and a resistive element heater that the present invention addresses is that they both involve current carrying elements. In Cappels the objective of the apparatus is to generate light, whereas in the subject invention, generation of heat is the objective. However, Cappels '930 does not utilize resistance as a key to monitor performance. Cappels measures radiance over time. This method may be effective for a radiating light source element such as is found in an overhead projector because the light source is either fully on or fully off with little or no input power variation when fully on. Therefore by monitoring the radiance output of a light source of this type should allow for prediction of failure. However, in the case of resistive element heaters, the method of Cappels will be ineffective because heater elements are very inefficient light producers even in the IR light spectrum. Thus, radiance sensors would not be effective in providing relevant information for predicting failure of a resistive element heater.

A more effective method is therefore needed to predict the failure of resistive element heaters.

SUMMARY OF INVENTION

It is in view of the above problems that the present invention was developed.

The invention thus has as an object to provide a system that can predict the failure and/or reliability of a resistive element heater.

The present invention involves a system that utilizes a method for predicting the failure of a resistive element heater and estimating service life consumed by using a known set of thermo-physical properties related to device construction parameters and measured operating characteristics.

The system actively correlates a laboratory generated database of variables that affect heater life, derived with respect to a baseline heater design and construction, to an actual thermal profile measured during heater service operation, or that correlates the variables to a predicted normalized thermal profile. Lab testing determines the operative design and construction variables present in a given heater and how these variables affect heater life. An eminent failure for a given heater is predicted by a method of monitoring temperature related stress that a given heater is subjected to. These stress events are then correlated to the historical life data for selected design and construction variables when subjected to similar stress events. Finally a determination is made of the stress events' total impact on service life or ultimately the amount of service life consumed. In order to make such a prediction, first, a temperature related oxidation life factor is assigned to each stress event based on the oxidation characteristics of an element alloy type. These stress event factors are cumulative over time. Second, a ratiometric construction factor of a given heater is derived with respect to a laboratory standard heater design, thereby creating a simplified life factor performance model for the given heater construction. Finally, a measured service life factor is derived with respect to a laboratory standard heater design based on the element alloy type. These factors are utilized in combination to derive a predicted percent service life consumed and percent service life remaining for a given heater during actual operation. This prediction is considered the "active form" of the invention because heater temperatures are measured during actual heater operation.

However, there is also a "passive form" of the invention were total service life of a given heater design is passively predicted (no actual operating measurements taken). In the passive form, in lieu of calculating measured service time, a mean operating life factor is used, and in lieu of taking periodic temperature measurements to define the operating profile, average temperatures are predicted based on the intended service application.

The estimate of service life consumption can be used to support statistical decisions concerning the likelihood of heater failure at a given point in time and the projected service life remaining based on the historical rate of consumption. The method may be hosted in software or firmware and incorporated within a heater control scheme such that executive decisions concerning scheduled maintenance for the heater resident application can be effected. The method may also be used as a design tool to estimate the expected life of a heater in a given application for logistic support analysis or reliability prediction purposes.

It is noted above that the prior art has concentrated largely on the search for a parametric method, meaning a method for detecting pending failure based on the change in a measurable parameter such as element electrical resistance, voltage, or current. These methods have been unsuccessful mostly because the rates of change of simple parameters such as resistance, although sometimes a good indicator of heater degradation, are not reliable as statistically consistent signatures of pending failure.

However, the inventor has accumulated a large database of information concerning the effect of various design, construction, and operating variables on heater life and key parameters have been identified. The inventor has determined that on/off cycling of the heater element and the varying temperatures that the element reaches are key in predicting operating life because of the effect temperature has on the oxidation rate of a resistive heater element. By utilizing this database of information related to design and construction parameters and a given thermal profile with the above method, the consumption of heater life can be actively measured against a statistical mean for that heater type and the life remaining can be predicted with good statistical confidence and this is the key to the inventors method.

BRIEF DESCRIPTION OF THE DRAWINGS

The above-mentioned and other features, advantages and objects of this invention, and in the manner in which they are obtained will become more apparent and will be best understood by reference to the detailed description in conjunction with the accompanying drawings which follow, wherein:

FIG. 4 is a table of calculated values taken from an example of the present method of predicting heater failure in "active mode".

DETAILED DESCRIPTION OF THE INVENTION

Figure 1:
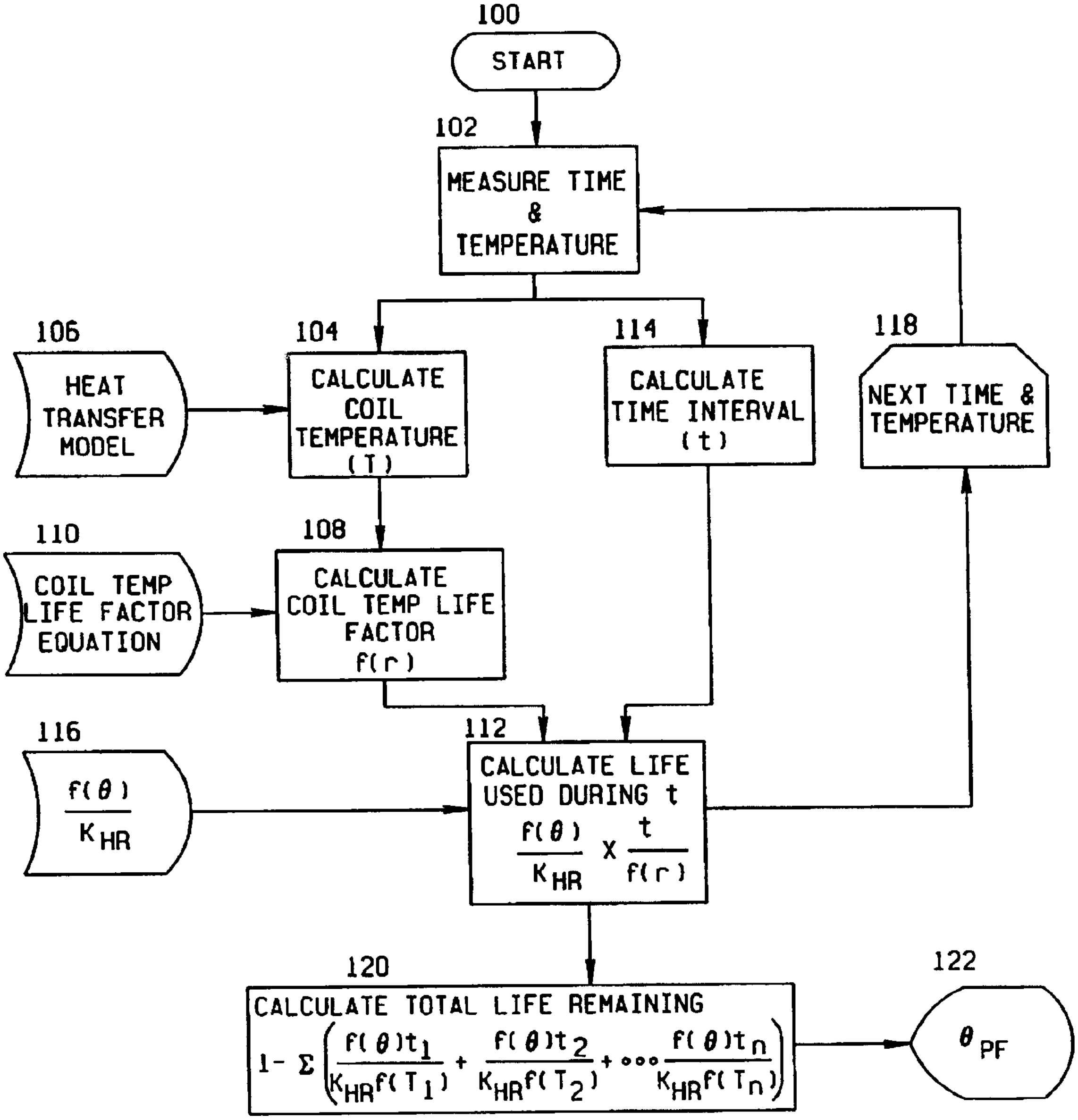
FIG. 1 is a flow diagram illustrating the present method of predicting heater failure in "active mode"

Referring now to FIG. 1 a flow chart is generally showing how the present invention is used to actively predict the remaining life of a resistive element heater. Before the method can be practiced however, certain factors specific to a particular type of heater must be obtained through experimentation or estimated based on extrinsic data. An example for a typical cartridge heater is shown below, however it should be noted that the appropriate factors may be obtained through experimentation for any type of heater and applied in the practice of the present invention. These factors obtained through measurement will be identified during the description to follow.

Block 100 is used as a reference point for the beginning of the process. The active mode begins with a series of iterations, each iteration beginning at block 102 with a measurement of the time and temperature. The time may be measured in any number of ways including the use of a real-time clock or based on a reference timer, so long as the time interval between measurements can be accurately calculated in block 114. The temperature measurement may similarly be taken anywhere on the heater so long as an accurate heat transfer model is available so that the coil temperature can be ascertained from the measured heater temperature.

The time and temperature measurements are passed to blocks 104 and 114, respectively. As previously mentioned, the important parameter affecting the life of cartridge and tubular heaters is the coil temperature. It is important to note, that for other types of heaters, a different parameter may conceivably be found to be the important factor in predicting failure. Assuming the measured temperature is not taken directly at the resistive coil, a heat transfer model at block 106 is used to manipulate the measured temperature into an accurate estimate of the coil temperature. For example, a measured temperature taken on the heater sheath can be used in conjunction with a Fourier conductive heat transfer model at block 106 to determine coil temperature, since the heater geometry and the relevant coefficients of conductive heat transfer are already known. More complex heat transfer models will need to be developed in instances where the temperature is taken from an external process (for example from a thermocouple located in fryer vat of oil). In some instances, the heater coil temperature may be taken by indirect means. For example if a coil wire has a known thermal coefficient of resistance, measurements may be taken on applied voltage and current draw to determine coil temperature.

Figure 3:
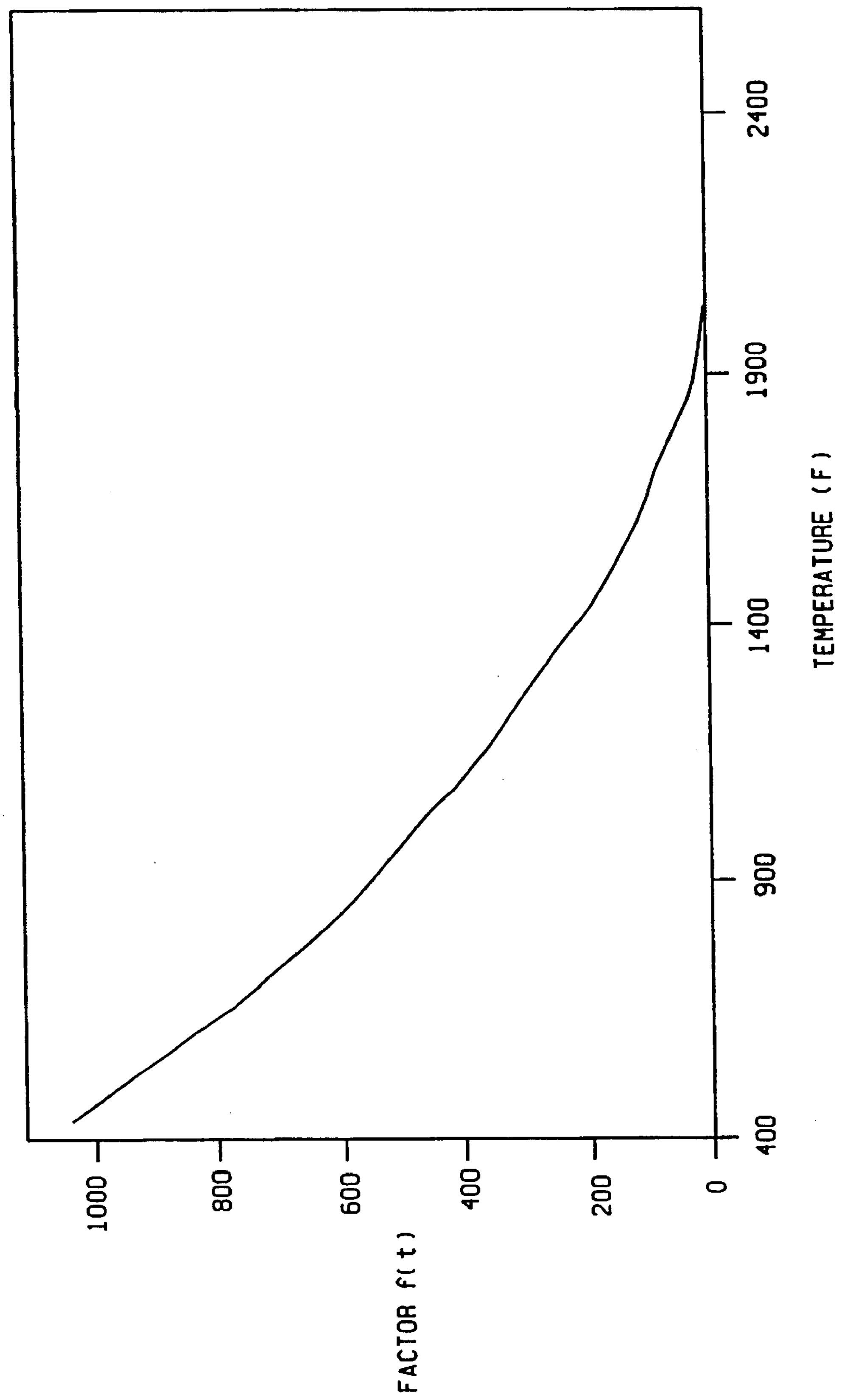
FIG. 3 is a graph showing a coil temperature life factor as compared to coil temperature for a reference heater.

Once the coil temperature is known, a coil temperature life factor equation at block 110 is applied to calculate the coil temperature life factor, $f_{(T)}$, at block 108. The factor, $f_{(T)}$, is calculated from the test data, which indicates relative wire life as a function of operating temperature. FIG. 3 shows a sample graph relating $f_{(T)}$ to temperature, T, for a particular heater coil type. The life factor, which has units of $sec^{-1}$, must either be calculated through laboratory testing for a particular heater coil type or may be obtained directly form some wire manufactures. The sample shown is for a typical NiCr (nickel chromium) resistive wire. The time interval, t, is simply calculated by subtracting the time at the measurement from the time at the previous measurement. The smaller the time interval, the more accurate the present system.

Once the life factor and time interval for the measurement are known, the percentage of the heater life used during that particular interval can be calculated at block 112 by multiplying the time interval divided by the life factor with the ratio of $f_{(\theta)}$ to $K_{HR}$. $f_{(\theta)}$ is a constant calculated in the laboratory by subjecting a heater constructed with the same type wire alloy of the subject heater to a series of temperature cycles of given average temperature and cycle rate and measuring the total time until failure occurs, and is specifically calculated by dividing the test cycle duration ($t/f_{(T)}$) by the total time the wire survives. $f_{(\theta)}$ is a scalar and as way of an example is $6.4\times10^{-7}$ for a typical type of NiCr resistive wire.

Similarly, $K_{HR}$ is a ratiometric factor based on the combined effects of the differences in construction parameters of the subject heater design with respect to a standard reference heater. The standard reference heater will always have a $K_{HR}$ of 1.00. Typical parameters which must be evaluated to calculate $K_{HR}$ include coil wire gage and physical size but can include a number of factors that of which one of ordinary skill in the field of heater design will be aware—namely any factor that effects service life of a particular type of heater element. Using coil wire gage as an example, if the reference heater in the laboratory is 28 AWG and testing indicates that reducing the gage to 25 AWG results in the heater lasting an average of 10% longer, then $K_{HR}$ for a heater identical to the reference heater but with a 25 AWG gage coil would be 1.10. It should be apparent that $f_{(\theta)}$ is a number that is the same for all heaters with the same type of heating element, while $K_{HR}$ is a number that will be the same for all heaters with the same exact design.

The formula in block 112 results in a number representing the estimated percentage of heater life used during the measured interval. Block 118 indicates that once the percentage of heater life used is calculated the iteration may begin. The more frequent the iterations, the more precise the life used calculations in block 112 will be. That calculated life used during the interval is passed to block 120 where a running total is maintained. The predicted fractional heater life remaining, $\theta_{PF}$, is calculated using the formula in block 120. The predicted fractional heater life remaining, $\theta_{PF}$, is simply a 1 (or 100%) minus the sum of the calculated portions of life used during the various intervals.

By way of example, the table in FIG. 4 shows an example of numbers calculated by use of the active mode. In the example, a flat tubular heater construction is used having a 1" wide by 0.430" diameter sheath and a design for 60 watts per square inch (WSI). The reference heater was a straight and round tubular heater with the same type of heating element of 28 AWG gage. The example heater has a 25 AWG gage coil, and was formed into a flat hairpin. The change of the coil gage from 28 AWG to 25 AWG has been found to increase heater life by 45% (all other factors remaining constant). The change of heater form from straight to a hairpin reduces heater life by 65% (all other factors remaining constant). The change of heater cross-section from a round tubular to a flat tubular decreases heater life by 5% (all other factors remaining constant). The resulting $K_{HR}$ for the example heater is thus 1.45×0.35×0.95, or 0.4821.

The example heater (and of course the reference heater as well) uses a standard NiCr wire as its resistive heating element. $f_{(\theta)}$ was found by testing to be $6.4\times10^{-7}$ for NiCr resistive heating elements.

The measured temperature in the sample is taken from a thermocouple located on the outside of the sheath. The coil temperature, $T_{coil}$, is calculated in the example by using a Fourier heat transfer model:

$$T_{coil} = T_{sheath} + \left\{245.6 \times WSI \times OD\left[\left(\frac{\ln\left(\frac{ID_{sheath}}{OD_{coil}}\right)}{K_{MgO}}\right) + \left(\frac{\ln\left(\frac{OD_{sheath}}{ID_{sheath}}\right)}{K_{sheath}}\right)\right]\right\}$$

where: $T_{sheath}$ is the measured temperature of the sheath, $OD_{sheath}$ is the outside diameter of the sheath (0.430"), $ID_{sheath}$ is the inside diameter of the sheath (0.370"), $OD_{coil}$ is the outside diameter of the coil (0.148"), WSI is the designed heat flux of the heater (60 watts per square inch), and K is the thermal conductivity of either the sheath or the insulating fill (magnesium oxide, MgO) measured in BTU·in/hr·° F.·ft$^2$.

It is assumed that the heater (and the failure prediction algorithm) was started at time 00:06.0. At time 00:07.0 (col. 1) the first measurement is taken so the interval time is 1 (col. 2). The measured sheath temperature at that time was 1200.83° F. (col. 3). The thermal conductivity of the insulating fill at that temperature is 8.90664 BTU·in/hr·° F.·ft$^2$ (col. 4) and the thermal conductivity of the sheath at that temperature is 153.04118 BTU·in/hr·° F.·ft$^2$ (col. 5). Using the Fourier model described above, the coil temperature was calculated at 1858.93° F. (col. 6). From the chart shown in FIG. 3, $f_{(T)}$(1858.93) is 24.061 s$^{-1}$ (col. 7). Because the interval was exactly one second, the coil temperature life factor for the interval was 0.0416 (col. 8). Applying the formula of block 112, it was calculated that $5.517\times10^{-8}$ of the life was used during the interval (col. 9). The total time used to that point was 1 second (col. 10) and the running total of the life used is $5.517\times10^{-8}$ (col. 11). Note col. 9 and col. 11 are the same in the first row, as there has only been one interval. An estimate of the total time remaining can be calculated according to the formula:

Total Time Remaining=(Total Time Used÷Total Life Used) (1−Total Life Used)

The total time remaining after the first iteration is 5034.86 hours (col. 12). This calculation becomes progressively more accurate with each iteration, and with a particularly consistent usage pattern for the heater, will eventually converge on an accurate countdown, in real time, until heater failure. More accurate at the beginning is the predicted fractional heater life remaining which is simply 100% minus the total fractional heater life used (from col. 11). After one iteration it was calculated as 99.999994% (col. 12). The iterations in the example continue every second, and can easily be followed in the same manner as above.

In apparatus form, the present method in active form is embodied by a system that continuously carries out the described calculations and has some form of an output to notify the user of the remaining life, either in hours or in terms of fractional life remaining. Optionally, an alarm can notify the user when a predetermined percentage of the life (or particular time) is remaining in the heater. The values specific to the heater design can be hard-coded into the system, input manually by the user or OEM, or even taken directly from the heater (by a bar code for example).

Figure 2:
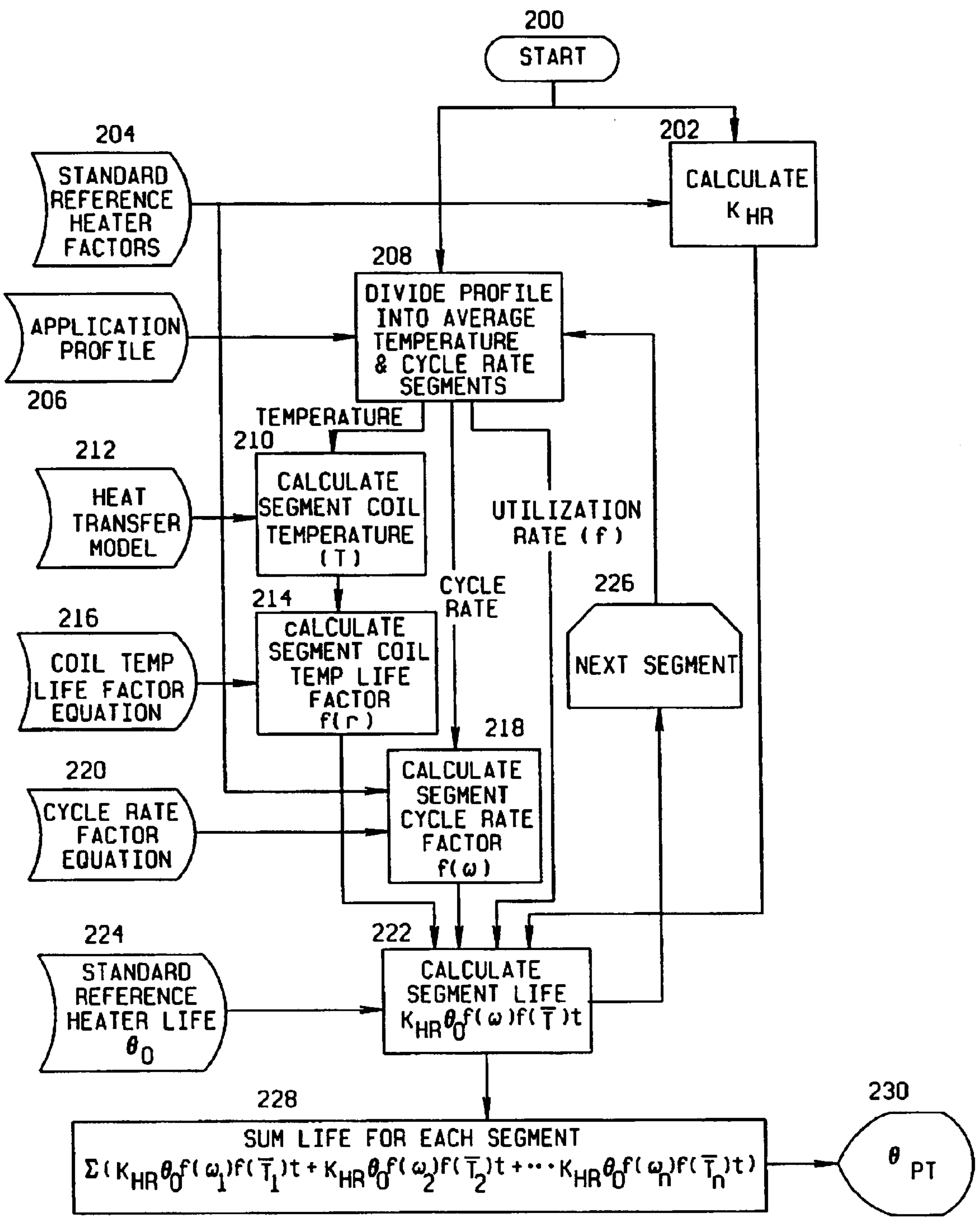
FIG. 2 is a flow diagram illustrating the present method of predicting heater failure in "passive mode"

Referring now to FIG. 2, the passive mode of the present method is shown generally. The passive mode is essentially the same as the active mode, however only the total life of the heater is calculated from the beginning. The purpose, therefore, of the passive mode is to estimate the total life of a particular heater design (e.g., in hours) based on a particular application and usage profile.

The passive mode flow chart starts out with a starting block 200, used for reference. To use the passive mode, $K_{HR}$ must be calculated the same as in the active mode, which is done in block 202. The standard reference heater factors from block 204 are combined with the factors specific to subject heater, such as size, shape, and wire gage of the coil. An accurate profile of the indented application is needed from block 206. The more accurate the profile of the application the more accurate the estimate of total life will be. The profile is broken down into discrete segments at block 208. Each segment represents a different uniform profile of operation. For instance, in a deep fryer vat, the start up of the heater (turning on the vat) would be one segment. Idle time, in which the vat is kept hot but with nothing cooking, would be a second segment. And process time, in which food is placed in the vat, would be a third segment.

For each segment, an average temperature, cycle rate, and utilization rate must be calculated. The utilization rate, t, is simply the percentage of the time, the heater is estimated to be within a particular segment of the profile. For instance, the heater may be in start up mode only 1% of the time, while 50% of the time it is standing idle, and 49% of the time it is operating in the process segment of the profile. The sum of the utilization rates for all segments will always be equal to 1 (or 100%). For a particular segment, the utilization rate, t, is passed on to block 222, discussed below. It is important to note that in the active mode, t, is a time interval measured in seconds, and in the passive mode, t, is a scalar fraction representing a percentage of total time.

The cycle rate is the frequency with which a particular segment of the profile repeats. For instance if when the heater is in the idle segment, the heater energizes at some reference time to keep the oil hot, then deenergizes at some point when the oil is hot enough, then repeats the cycle three-and-a-half minutes after the reference time (and continues to repeat this cycle), the cycle rate would be 210 seconds. Using the data from the reference heater and a cycle rate factor equation (block 220) a segment cycle rate factor, $f_{(\omega)}$, is calculated at block 218. The cycle rate equation factor is obtained through laboratory testing and is a measure of how changes in a cycle rate affect heater life. For example, if the standard reference heater was tested with a 2 minute cycle rate, that cycle rate would have a cycle rate factor of 1.0. If testing showed that reducing the cycle rate to 1 minute increased heater life 10% then the cycle rate factor of 1.1.

The average temperature for a particular segment is passed on to block 214. However, if the temperature is measured from a place other than the coil, a heat transfer model (block 212) must be used to calculate average coil temperature (block 210) the same as was done in the active mode. The coil temperature is used to calculate a segment temperature life factor, $f_{(\bar{T})}$. This is the ratio of coil life factor, $f_{(T)}$, (as used in the active mode) for the segment temperature to the coil life factor, $f_{(T)}$, for the temperature of the reference heater. For each segment, the segment life is calculated using the following formula:

$$\text{Segment Life}=K_{HR}T_0 f_{(Z)} f_{(\bar{T})} t$$

where $\theta_0$ is the mean operating life of the standard reference heater in the laboratory.

The calculation is then repeated (block 226) until each segment life has been calculated. The total life of the heater is calculated in block 228 by simply summing the life of each particular segment. The predicted total life, $\theta_{PT}$ (block 230), is the output of the method and of the sum calculated in block 228.

As an example, if the heater ($K_{HR}$=0.482) is for a frying vat and the heater will be in the start up segment 1% (t=0.01) of the time at an average coil temperature of 1875° F. ($f_{(T)}$=20.4) and a cycle rate of 15 seconds ($f_{(\omega)}$=4.0), the predicted life for that segment may be predicted. The reference heater in this case had a mean time to failure of 198 hours ($\theta_0$) and an average coil temperature of 2378° F. ($f_{(T)}$=1.8). Thus the segment coil temperature life factor with respect to the reference heater, $f_{(\bar{T})}$, is 20.4/1.8, or 11.33 (meaning a heater coil of this type will last 11.33 times longer at 1875° F. as opposed to 2378° F. Thus, the segment life is 0.482×198 hours×4.0×11.33×0.01, or 43.25 hours.

The heater is in the idle segment 50% of the time (t=0.50) at an average coil temperature of 856° F. ($f_{(T)}$=585.0) with a cycle rate of 210 seconds ($f_{(\omega)}$=0.875). Thus for the idle segment, the segment coil temperature life factor with respect to the reference heater, $f_{(\bar{T})}$, is 585.0/1.8, or 325.0. The segment life for the idle segment is 0.482×198 hours×0.875×325×0.5, or 13,569 hours.

The heater is in the idle segment 49% of the time (t=0.49) at an average coil temperature of 989° F. ($f_{(T)}$=483.0) with a cycle rate of 150 seconds ($f_{(\omega)}$=0.95). Thus for the idle segment, the segment coil temperature life factor with respect to the reference heater, $f_{(\bar{T})}$, is 483.0/1.8, or 268.3. The segment life for the idle segment is 0.482×198 hours×0.95×268.3×0.49, or 11,919 hours. Thus given the application profile, the predicted total life of the heater, $\theta_{PT}$, is 43+13,569+11,919, or 25,531 hours. This value could then be used by the user of the fryer vat to estimate how often they should replace the heaters in the fryers.

Accordingly, while this invention is described with reference to a preferred embodiment of the invention, it is not intended to be construed in a limiting sense. It is rather intended to cover any variations, uses or adaptations in the invention utilizing its general principles. Various modifications will be apparent to persons skilled in the art upon reference to this description. It is therefore contemplated that the appended claims will cover any such modifications or embodiments as fall within the true scope of the invention.

What is claimed is:

1. A method of predicting failure of a resistive element heater comprising the steps of:

compiling a historical database of design and construction variables that effect the life of a resistive element heater during service operation based on testing of a lab standard heater;

assigning a ratiometric life factor to each variable within the representative set of design and construction variables for a given heater and creating a simplified model by factoring the individual life factors together;

normalizing actual service time on a given heater to an equivalent time on the laboratory standard heater;

measuring the thermal profile of the resistive element heater by measuring the heater temperature at set time intervals and assigning each interval an element temperature related stress oxidation life factor based on the historical database and defining a cumulative life factor;

mathematically manipulating the ratiometric life factor, the normalized service time, and the cumulative life factor in such a manner to predict fractional life remaining; and wherein the compiling step comprises the sub-steps of:

compiling historical test data on the effect of a resistive element alloy on the life of a resistive element heater;

compiling historical test data on the effect of a resistive element's page on the life of a resistive wire heater;

compiling historical data on the effect of a heater type on the life of a resistive element heater;

compiling historical data on the effect of a heater element formation on the life of a resistive heater;

consolidating the historical data for wire alloy, wire gauge, element type and element formation into an indexable data base; and assigning factors to each data element for varying operating temperatures representative of the data element's effect on operating life when subjected to said temperatures.

2. The method of claim 1, where assigning a ratiometric life factor to each variable is based on (1) a fixed thermo-physical operating profile; and (2) each variable's characteristic reaction when subjected to said operating profile.

3. The method of claim 1, where measuring the actual thermal profile comprises the steps of:

measuring the resistive element sheath temperature; and calculating the heater element temperature using a Fourier heat transfer function based on known heater construction and thermo-physical properties.

4. The method of claim 3, where calculating the element temperature comprises the steps of:

operating on heater formation variables with a Fourier heat transfer function to obtain a heat transfer factor;

calculating the thermal conductivity of the sheath and a given insulator based on known values for their respective materials;

measuring the sheath temperature; and mathematically manipulating the heat transfer factor, the thermal conductivity, and the sheath temperature in such a fashion to determine the element temperature.

5. The method of claim 1, where normalizing the actual service time is performed by normalizing the measurement operating time interval with the oxidation life factor.

6. The method of claim 1, where the mathematical manipulation is performed by factoring the life factors and the service time function together.

7. The method of claim 1, wherein the measuring step is approximated by predicting an estimated temperature profile based on an intended service application.

8. An apparatus that performs the method of claim 1.

* * * * *